United States Patent
Siddiqui

(10) Patent No.: US 10,865,295 B2
(45) Date of Patent: *Dec. 15, 2020

(54) ASPHALTENE/POLYETHYLENE BLEND

(71) Applicant: KING FAHD UNIVERSITY OF PETROLEUM AND MINERALS, Dhahran (SA)

(72) Inventor: Mohammad Nahid Siddiqui, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 198 days.

This patent is subject to a terminal disclaimer.

(21) Appl. No.: 16/125,332

(22) Filed: Sep. 7, 2018

(65) Prior Publication Data

US 2019/0002675 A1 Jan. 3, 2019

Related U.S. Application Data

(63) Continuation of application No. 15/192,412, filed on Jun. 24, 2016, now Pat. No. 10,125,246.

(51) Int. Cl.
C08L 23/06 (2006.01)
C08L 95/00 (2006.01)

(52) U.S. Cl.
CPC ............. C08L 23/06 (2013.01); C08L 95/00 (2013.01); C08L 2207/066 (2013.01); C08L 2555/22 (2013.01)

(58) Field of Classification Search
CPC ........................................................ C08L 23/06
See application file for complete search history.

(56) References Cited

U.S. PATENT DOCUMENTS 4,868,233 A  9/1989 Moran

FOREIGN PATENT DOCUMENTS

CA   636441 A   2/1962
CN   101104742 A   1/2008
(Continued)

OTHER PUBLICATIONS

Diana Paola Powers. "Characterization and Asphaltene Precipitation Modeling of Native and Reacted Crude Oils", Calgary, Alberta, Sep. 2014. 296 pages.

(Continued)

Primary Examiner — Arrie L Reuther
(74) Attorney, Agent, or Firm — Oblon, McClelland, Maier & Neustadt, L.L.P.

(57) ABSTRACT

A low density polyethylene-asphaltene composition and a method of preparation of the low density polyethylene-asphaltene composition, the composition comprising an asphaltene, wherein the asphaltene is extracted from at least one of a heavy atmospheric residue, oil sands, bitumen, and biodegraded oils, and a weight percent of the asphaltene is 0.1%-25% relative to a total weight of the composition; and a low density polyethylene polymer with a density of 0.9 g/cm$^3$-0.95 g/cm$^3$. The asphaltene and the low density polyethylene polymer are uniformly dispersed throughout the low density polyethylene-asphaltene composition, the low density polyethylene-asphaltene composition has a weight loss onset 4° C.-20° C. higher than an average weight loss onset of the low density polyethylene polymer, and the low density polyethylene-asphaltene composition has a degree of crystallinity of 27%-34%.

6 Claims, 13 Drawing Sheets

(56) References Cited

FOREIGN PATENT DOCUMENTS

CN 100567400 C 12/2009
WO 2007/030448 A2 3/2007

OTHER PUBLICATIONS

B. Singh, et al., "Polymer-modified bitumen of recycled LDPE and maleated bitumen", Journal of Applied Polymer Science, vol. 127, Issue 1, Apr. 2012, 2 pages (abstract only).
English Machine Translation of CN 101104742A. Obtained Apr. 4, 2018 at https://worldwide.espacenet.com/publicationDetails/biblio?CC=CN&NR=101104742A&KC=A&FT=D&ND=3&date=20080116&DB=EPODOC&locale=en_EP# (Year: 2008).
"Alkylation and Oxidation Reactions of Arabian Asphaltenes", Fuel, 2003, 82(11), p. 1323, Abstract (Year: 2003).

ASPHALTENE/POLYETHYLENE BLEND

CROSS-REFERENCE TO RELATED APPLICATIONS

The present application is a Continuation of Ser. No. 15/192,412, now allowed, having a filing date of Jun. 24, 2016.

BACKGROUND OF THE INVENTION

Technical Field

The present invention relates to a composition or composite having asphaltene filler and low density polyethylene.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Polymer composites are mixtures of polymers with inorganic or organic additives. Thus, polymer composites contain two or more components and two or more phases. A modified polymer matrix is formed by incorporation of fillers and has micro- and macrostructures which possess unique physiochemical properties. Therefore, the main reasons behind using these fillers include enhancement of properties, overall cost reduction as relatively lesser amount of polymeric material is required, and improved processing characteristics which reduces the required energy and time.

The additives for polymer composites have been variously classified as reinforcements, fillers, or reinforcing fillers. Reinforcements, being much stiffer and stronger than the polymer, usually increase its modulus and strength. Thus, mechanical property modification may be considered as their primary function, although their presence may significantly affect thermal expansion, transparency, thermal stability, and so on. However, most fillers are considered as additives, which, because of their unfavorable geometrical features, surface area, or surface chemical composition, may only moderately increase the modulus of the polymer, whereas strength (tensile, flexural) remains unchanged or even decreased. Depending on the type of filler, other polymer properties can be affected; for example, melt viscosity can be significantly increased through the incorporation of fibrous materials. On the other hand, mold shrinkage and thermal expansion may be reduced, a common effect of most inorganic fillers.

In view of the forgoing, one objective of the present invention is to provide a composition or composite comprising asphaltenes and Low Density Polyethylene (LDPE).

BRIEF SUMMARY OF THE INVENTION

According to a first aspect a low density polyethylene-asphaltene composition having an asphaltene, wherein the asphaltene is extracted from at least one of a heavy atmospheric residue, oil sands, bitumen, and biodegraded oils, and a weight percent of the asphaltene is 0.1%-25% relative to a total weight of the composition, and a low density polyethylene polymer with a density of 0.9 g/cm$^3$-0.95 g/cm$^3$. The asphaltene and the low density polyethylene polymer are uniformly dispersed throughout the low density polyethylene-asphaltene composition, the low density polyethylene-asphaltene composition has a weight loss onset 4° C.-20° C. higher than an average weight loss onset of the low density polyethylene polymer, and the low density polyethylene-asphaltene composition has a degree of crystallinity of 27%-34%.

In some embodiments, the low density polyethylene-asphaltene composition has a peak melting point of 110° C.-123° C.

In some embodiments, the low density polyethylene-asphaltene composition has a heat of fusion of 84 J/g-93 J/g.

In some embodiments, the low density polyethylene-asphaltene composition has a storage modulus of 8%-25% greater than an average storage modulus of the low density polyethylene polymer at a temperature of 22° C.-25° C.

In some embodiments, the low density polyethylene-asphaltene composition has a tensile strength of 3%-5% greater than an average tensile strength of the low density polyethylene polymer.

In some embodiments, a weight percent of the low density polyethylene polymer is 75%-99.9% relative to the total weight of the composition.

According to a second aspect, a method to prepare a low density polyethylene-asphaltene composition including melting a low density polyethylene polymer to form a melted low density polyethylene polymer, adding an asphaltene and mixing, wherein the asphaltene is a semi-crystalline solid, to the melted low density polyethylene polymer at a mixing temperature of 165° C.-200° C. to form a melted low density polyethylene-asphaltene blend, pressing the melted low density polyethylene-asphaltene blend to form a pressed low density polyethylene-asphaltene blend, and cooling the pressed low density polyethylene-asphaltene blend to a cooled temperature of 22° C.-30° C. to form the low density polyethylene-asphaltene composition.

In some implementations of the method, the low density polyethylene polymer is melted at a melting temperature of 165° C. to 200° C.

In some implementations of the method, the melted low density polyethylene-asphaltene blend is pressed for a duration of 1 min-10 min.

In some implementations of the method, the melted low density polyethylene-asphaltene blend is pressed at a pressing temperature of 175° C.-200° C.

In some implementations of the method, the melted low density polyethylene-asphaltene blend is pressed at a pressure of 7 MPa-10 MPa.

In some implementations of the method, the asphaltene is extracted from at least one of a heavy atmospheric residue, oils sands, bitumen, and biodegraded oils.

In some implementations of the method, the asphaltene is a semi-crystalline solid.

In some implementations of the method, the low density polyethylene-asphaltene composition has a peak melting point of 110° C.-123° C.

In some implementations of the method, the low density polyethylene-asphaltene composition has a degree of crystallinity of 27%-34%.

In some implementations of the method, the low density polyethylene-asphaltene composition has a heat of fusion of 84 J/g-93 J/g.

In some implementations of the method, the low density polyethylene-asphaltene composition has a weight loss onset 4° C.-20° C. higher than an average weight loss onset of the low density polyethylene polymer.

In some implementations of the method, the low density polyethylene-asphaltene composition has a storage modulus of 8%-25% greater than an average storage modulus of the low density polyethylene polymer at a temperature of 22° C.-25° C. and the low density polyethylene-asphaltene composition has a tensile strength of 3%-5% greater than an average tensile strength of the low density polyethylene polymer.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
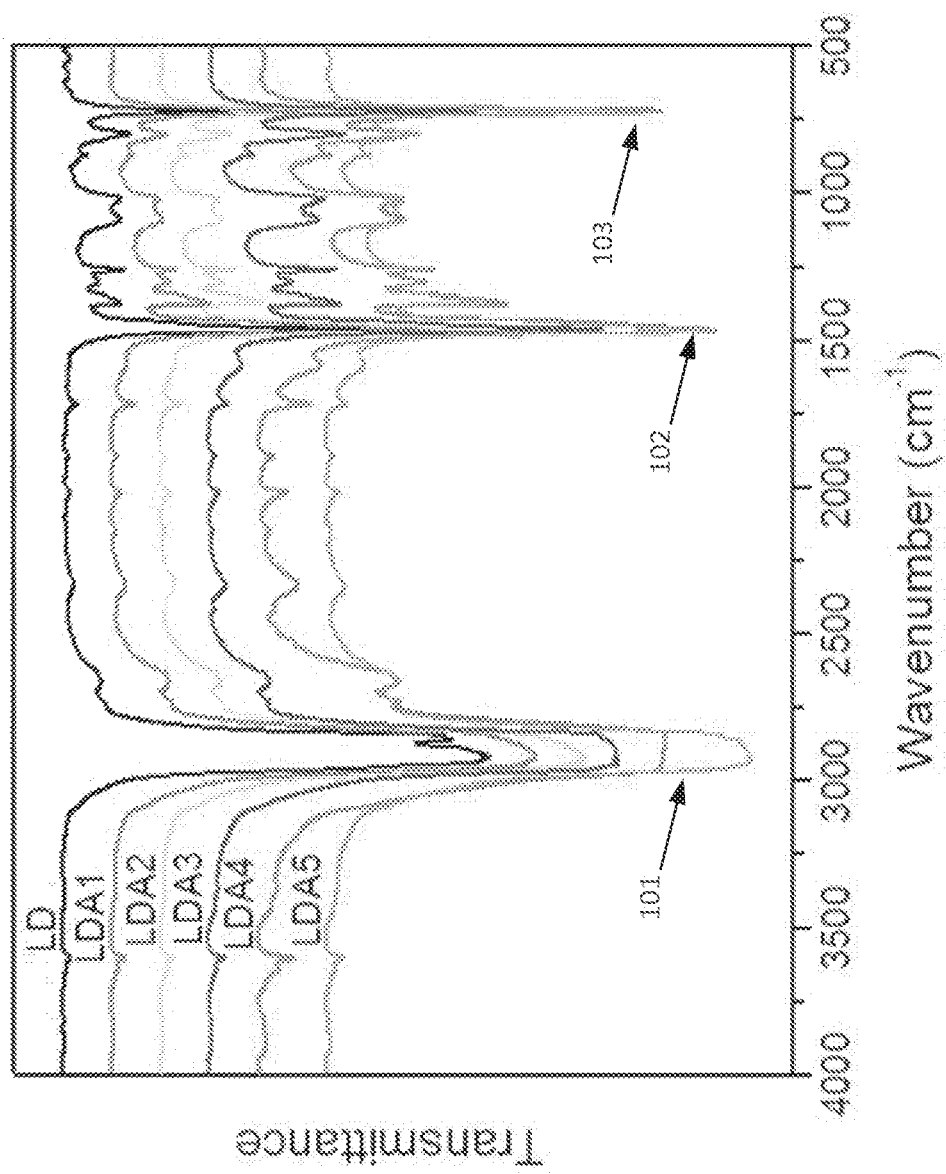
FIG. 1 is a FTIR spectrum of LDPE and LDPE/asphaltenes composites with varying amounts of asphaltenes.

Throughout the specification ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

According to a first aspect a low density polyethylene-asphaltene composition having an asphaltene, wherein the asphaltene is extracted from at least one of a heavy atmospheric residue, oil sands, bitumen, and biodegraded oils. More specifically, the asphaltene of the present disclosure may be extracted from Arab heavy atmospheric residue. The low density polyethylene-asphaltene composition described by the present disclosure may also be referred to interchangeably as a low density polyethylene-asphaltene composite. Asphaltene, as used herein, differs from asphalt, and refers to molecular substances that may be found in crude oil, along with resins, aromatic hydrocarbons, and saturates. Asphaltenes are composed mainly of polyaromatic carbon ring units which may contain one or more of an oxygen, nitrogen, and sulfur heteroatoms, optionally combined with trace amounts of heavy metals, particularly chelated vanadium and nickel, and aliphatic side chains of various lengths. Asphaltene is insoluble in light n-paraffinic hydrocarbon, i.e. n-heptane, but is soluble in toluene.

Asphalt is a colloidal system similar to petroleum, but with lighter molecules removed. Asphalt can be fractionated into 4 major components: saturates, aromatics, resins and asphaltenes. The fractionated part of saturates and aromatics is considered as gas oil.

Polarity of these four fractions can be arranged as:
saturates<aromatics<resin<asphaltenes.

Asphalt is soluble in carbon disulfide. Due to the aromatics, an asphalt is heavier than its constituent asphaltenes.

Asphaltenes generally impede producing, transporting and refining of crude oil resources for a variety of reasons. Mitigation of deleterious effects brought on by the inclusion of asphaltenes during hydrocarbon processing requires a thorough knowledge of the chemical and physical properties of asphaltenes. In addition, the heavy ends of crude oils have many familiar applications related to protective coatings and road paving which can be enhanced by judicious application of asphaltene science. It is accepted that the asphaltene structure is composed by aromatic rings, alkane chains and cyclic alkanes with heteroatoms within the asphaltene structure, as described above. Two types of structures have been postulated: the "continent" or island structure (a) and the "archipelago" structure (b).

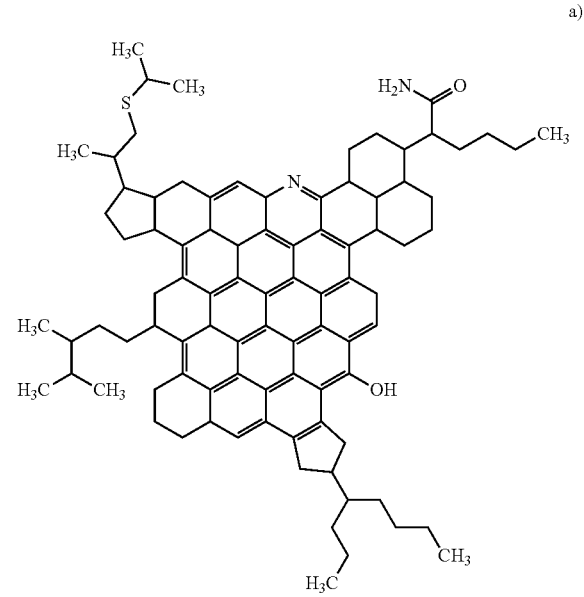 [SMILES: CCCCC(CCC)C1Cc2c(c3c(O)c4c5c6c(c7c8c9c6c6c%10c%11c%12c(c2=CC2CCCC(=C%13C(CCC(C)C(C)C)CC%14=C%15C%16CCC(C(C)CSC(C)C)C%16CC%16=CC(N=C8C8CCC(C(CCCC)C(N)=O)C%17CCCC7C8%17)C=9C(C6=C%14C%13%11)C%16%15)C=%122)c3c%105)CC=4)C1]

-continued b)

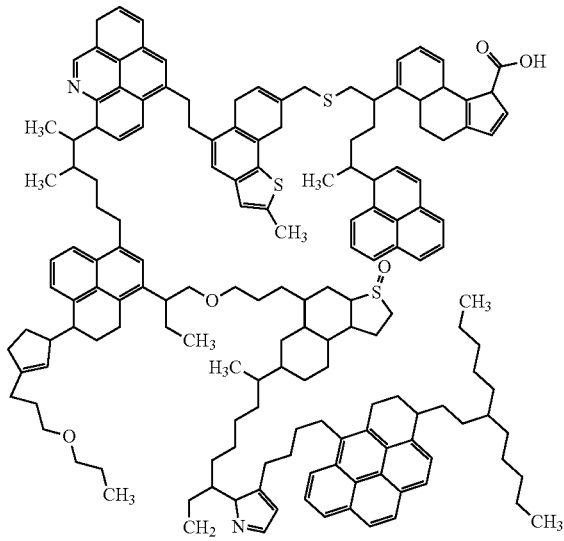

The continent structure (a) represents asphaltene as relatively flat disk shape molecules with a dominantly aromatic core (usually consisting of more than seven rings) and a periphery of aliphatic chains. The archipelago structure (b) may consist of small aromatic groups (up to four rings) which may be connected to each other by aliphatic chains with carbon numbers up to 24. Gel permeation, thermal degradation, oxidation and angle neutron scattering show evidence of this structure. See Powers, Diana P. (2014) "Characterization and Asphaltene Precipitation Modeling of Native and Reacted Crude Oils," (Doctoral thesis) University of Calgary, Calgary, Alberta, Canada, incorporated herein by reference in its entirety.

An asphaltene source may be characterized by a quantity of saturates, aromatics, and resins which may be fractionated. Different sources have different quantities of saturates, aromatics, resins, and asphaltenes. For example, from western Canadian oils saturates may be from 8 to 17 wt % relative to the total oil, aromatics may be from 36 to 44 wt % relative to the total oil, resins may be from 18 to 27 wt % relative to the total oil, asphaltenes may be from 15 to 20 wt % relative to the total oil; from Arabian oils saturates may be from 22 to 25 wt % relative to the total oil, aromatics may be from 26 to 50 wt % relative to the total oil, resin may be 10 to 18 wt % relative to the total oil, and asphaltenes may be 30 to 36 wt % relative to the total oil; and from Sumatran oils, saturates from 44 to 46 wt % relative to the total oil, aromatics may be from 30 to 33 wt % relative to the total oil, resins may be from 15 to 17 wt % relative to the total oil, asphaltenes may be from 7 to 10 wt % relative to the total oil. Oils from different regions have different characterizations based on saturates, aromatics, and resins, and asphaltenes, thus the asphaltenes extracted from these sources also has a different composition. Asphaltenes extracted from Californian oil may contain 1.9 to 2.2 wt % of nitrogen, 7 to 8.4 wt % of sulfur, and 2.4 to 2.7 wt % of oxygen relative to the total weight of the asphaltene; the asphaltene extracted from Canadian oil may contain 1.2 to 1.4 wt % nitrogen, 0.4 to 0.5 wt % of sulfur, and 2.1 to 2.7 wt % of oxygen, relative to the total weight of the asphaltene; the asphaltene extracted from Arabian heavy oil may contain 0.9 to 1.8 wt % of nitrogen, 7.5 to 8.1 wt % of sulfur, 1.9 to 2.6 wt % of oxygen, relative to the total weight of the asphaltene. Further, metal content may distinguish asphaltenes obtained from the above mentioned regions as well. For example, asphaltenes extracted from Californian oil may contain 340 to 410 ppm of nickel, 930 to 1100 ppm of vanadium, and 11.9 to 1800 ppm of sodium relative to the total volume of the asphaltene; the asphaltene extracted from Canadian oil may contain 19 to 28 ppm of nickel, 42 to 48 ppm of vanadium, and 43 to 1800 ppm of sodium, relative to the total volume of the asphaltene; the asphaltene extracted from Arabian heavy oil may contain 350 to 410 ppm of nickel, 1000 to 1200 ppm of vanadium, and 27 to 25,000 ppm of sodium, relative to the total volume of the asphaltene.

The average molecular weight of asphaltene may be on the order of 700 g/mol-1300 g/mol. Recent studies have shown that asphaltenes may start forming nanoaggregates at concentrations lower than 30 μg/ml-70 μg/ml. The average nanoaggregate molecular weight in solution with toluene appears to consist of two to six monomers per aggregate according to some studies, although they may range in size up to 30,000 g/mol or even 100,000 g/mol according to other studies.

The presently disclosed composition includes a weight percent of the asphaltene relative to a total weight of the composition of about 0.1%-25%, about 0.2%-15%, about 0.5%-10%, about 1%-8%, preferably about 2%-7%, more preferably about 3%-6%, or most preferably about 4%-5%. The composition includes a low density polyethylene polymer, wherein the low density polyethylene (LDPE) polymer is a density of about 0.9 g/cm$^3$-0.95 g/cm$^3$ or about 0.92 g/cm$^3$-0.93 g/cm$^3$. The LDPE may have a melt index of 1.5-2.7, 1.6-2.6, 1.7-2.5, and 1.8-2.4 and may have an average MW of 70,000 to 100,000, 75,000 to 95,000, or 80,000 to 90,000. The asphaltene and the LDPE polymer are uniformly dispersed throughout the low density polyethylene-asphaltene composition.

In one embodiment, the composition consists of low density polyethylene and the asphaltene.

The addition of asphaltenes to low density polyethylene may form a protective layer (thermal shield) around the polymer molecules which delays the degradation induced by heat and acts as a thermal barrier limiting the emission of the gaseous degradation products, which may result in an increase in the thermal stability of the material, also known as an increase in the weight loss onset. The low density polyethylene-asphaltene composition has a weight loss onset relative to an average weight loss onset of the LDPE polymer of about 4° C.-20° C. higher, about 5° C.-18° C. higher, about 6° C.-16° C. higher, or about 7° C.-14° C. higher. The homogeneous dispersion of asphaltenes may result in trapping the volatilizing matrix from escape to the atmosphere. The addition of asphaltenes to the low density polyethylene may generate a nucleating effect of asphaltenes in the LDPE matrix. An increase in the degree of crystallinity was observed in the low density polyethylene-asphaltene composition relative to the LDPE. The addition of asphaltenes to the LDPE results in the low density polyethylene-asphaltene composition having a degree of crystallinity higher than the LDPE polymer by about 27%-34%, about 28%-33%, about 29%-32%, or about 30%-31%.

In some embodiments, the low density polyethylene-asphaltene composition may have an increased gel permeation chromatography branching index relative to LDPE that is about 1%-20% higher, about 2%-15% higher, about 5%-10% higher, or about 7%-8% higher.

In some embodiments, the low density polyethylene-asphaltene composition has a peak melting point of about 110° C.-123° C., about 112° C.-120° C., or about 114° C.-118° C. The peak melting point may be measured by differential scanning calorimetry (DSC). DSC is a thermoanalytical technique in which the difference in the amount of heat required to increase the temperature of a sample and reference is measured as a function of temperature. Both the sample and reference are maintained at nearly the same temperature throughout the experiment. The DSC measurements may be used to derive heat of fusion information as well. In some embodiments, the low density polyethylene-asphaltene composition has a heat of fusion of about 84 J/g-93 J/g, about 85 J/g-90 J/g, or about 86 J/g-89 J/g.

In some embodiments, the low density polyethylene-asphaltene composition has a storage modulus relative to an average storage modulus of the low density polyethylene polymer at a temperature of about 22° C.-25° C. or about 23° C.-24° C., of about 8%-25% greater, about 10%-20% greater, about 12%-18% greater, or about 15%-16% greater.

In some embodiments, the low density polyethylene-asphaltene composition has a tensile strength relative to an average tensile strength of the low density polyethylene polymer of about 3%-5% greater or about 3.5%-4.5% greater. The tensile strength may be measured by a dynamic mechanical analysis (DMA), which is a technique useful for studying the viscoelastic behavior of polymers. A sinusoidal stress is applied and the strain in the material is measured, allowing one to determine a ratio of stress to strain.

In some embodiments, a weight percent of the low density polyethylene polymer relative to the total weight of the composition is about 75%-99.9%, about 80%-95%, about 85%-90%, or about 87%-88%.

In some embodiments, the low density polyethylene-asphaltene composition may further include high density polyethylene (HDPE) polymer of a density of about 0.95 g/cm$^3$-0.99 g/cm$^3$ or 0.96 g/cm$^3$-0.98 g/cm$^3$, a linear low density polyethylene (LLDPE) polymer of a density of 0.90 g/cm$^3$-0.93 g/cm$^3$ or 0.91 g/cm$^3$-0.92 g/cm$^3$, a polystyrene polymer, or a polypropylene polymer in a weight percent relative to the composition of about 0.1%-10%, about 0.5%-8%, about 1%-5%, or about 2%-4%. The HDPE, LLDPE, polystyrene, or the polypropylene polymers may be included to tune modulus and strength, thermal expansion, transparency, thermal stability, and other properties understood by those familiar in the art.

In some embodiments, the low density polyethylene may include, but is not limited to pure LDPE, a reinforced LDPE, such as carbon-fiber reinforced LDPE, glass fiber reinforced LDPE, or natural fiber reinforced LDPE, a nanoparticle-low density polyethylene composite, such as a graphite-LDPE composite, a silica nanoparticle-LDPE composite, or an alumina nanoparticle-LDPE composite, branched LDPE having long-chain branches or short chain branches.

A method to prepare a low density polyethylene-asphaltene composition begins by melting a low density polyethylene polymer to form a melted low density polyethylene polymer. In some implementations of the method, the melting of the low density polyethylene polymer is at a melting temperature of about 165° C. to 200° C., about 170° C. to 190° C., about 175° C. to 185° C., or about 178° C. to 182° C. In some implementations of the method, the melting process further includes mixing in an industrial plastic mixer having both heating and mixing capabilities simultaneously. A rotor speed during mixing may be at about 40 rpm-80 rpm, about 50 rpm-70 rpm, or about 55 rpm-65 rpm and may be continuous for a duration of about 1 minutes-10 minutes, about 2 minutes-8 minutes, or about 4 minutes-6 minutes.

The melting is followed by adding an asphaltene to the melted low density polyethylene polymer and mixing. In some implementations of the method, the asphaltene is extracted from at least one of a heavy atmospheric residue, oils sands, bitumen, and biodegraded oils. In some implementations of the method, the asphaltene is a semi-crystalline solid. A semi-crystalline solid may be described as having a highly ordered molecular structure with sharp melt points. Semi-crystalline solids may not gradually soften with a temperature increase, instead, semi-crystalline materials may remain solid until a given quantity of heat is absorbed and then rapidly change into a low viscosity liquid. The asphaltene may be a semi-crystalline solid when it is to be added to the melted low density polyethylene polymer or a molten polymer. The asphaltene employed in the preparation is as described herein. Upon adding the semi-crystalline asphaltene to the melted low density polyethylene polymer, the mixing begins at a rotor speed of about 40 rpm-80 rpm, about 50 rpm-70 rpm, or about 55 rpm-65 rpm for a duration of about 3 minutes to 10 minutes or about 5 minutes to 8 minutes. The mixing temperature during the adding of the semi-crystalline asphaltene to the melted low density polyethylene polymer may be about 165° C.-200° C., about 170° C.-190° C., about 175° C.-185° C., or about 178° C.-182° C. Upon adding the semi-crystalline asphaltene and mixing the semi-crystalline asphaltene into the melted low density polyethylene polymer a melted low density polyethylene-asphaltene blend is formed. In some implementations of the method, the melting and the adding and mixing of the asphaltene may occur simultaneously.

In some implementations of the method, the melting and the mixing may be accomplished by equipment such as a Brabender Plasti-Corder, Lab-Station or twin screw extruders (i.e. a mini-compounder, lab-compounder), a single-screw extruder. Commercially, twin-screw extruders are generally utilized. Other apparatus and components may include, without limitation, rollers, BANBURY® mixtures and kneaders. Regardless, mixers providing high-shear efficiency are especially useful. Both batch and continuous processing can be employed. Such apparatus, components, operation and parameters thereof may be understood by those skilled in the art.

Following the formation of the melted low density polyethylene-asphaltene blend, the melted low density polyethylene-asphaltene blend may be pressed to form a pressed low density polyethylene-asphaltene blend. In some implementations of the method, the pressing is at a pressure of about 7 MPa-10 MPa, about 7.5 MPa-9.5 MPa, or about 8 MPa-9 MPa. In some implementations, the melted low density polyethylene-asphaltene blend is pressed for a duration of about 1 min-10 min, about 2 min-7 min, or about 4 min-5 min. In some implementations of the method, the pressing is at a pressing temperature of about 175° C.-200° C., about 175° C.-195° C., or about 180° C.-190° C. In some implementations, the pressing may be directed into a mold to form a shape with the low density polyethylene-asphaltene blend. The blend may be formed into sheets, pellets, solid shapes, or hollow shapes.

Upon forming the pressed low density polyethylene-asphaltene blend, the blend is cooled to a temperature of about 22° C.-30° C., about 22° C.-30° C. The cooling may be accomplished by passive cooling, such as cooling in ambient air to dissipate heat, or via active cooling methods such as industrial fans, cooling coils, dipping in cooling water, or refrigeration. The cooling forms the low density polyethylene-asphaltene composition. In some implementations, a rate of cooling is about 0.5° C./min-3° C./min, about 0.75° C./min-2.5° C./min, about 1° C./min-2° C./min, or about 1.25° C./min-1.5° C./min.

The low density polyethylene-asphaltene composition resulting from the above described method of preparation has a peak melting point, a degree of crystallinity, a heat of fusion, a weight loss onset, a storage modulus, and a tensile strength as described herein.

The low density polyethylene-asphaltene composition and variations described in the present disclosure may have application in roofing adhesives, tar-replacements, roofing underlayment, or concrete mix fillers.

The examples below are intended to further illustrate the low density polyethylene-asphaltene composition and are not intended to limit the scope of the claims.

Example 1

The present example discloses a use of asphaltenes as an additive to Low Density Polyethylene (LDPE). Several composites of LDPE with different amounts of Asphaltenes were prepared by melt-mixing. The chemical structure of the composites was studied with Fourier Transform Infra-Red (FTIR) spectroscopy, crystalline characteristics with X-ray Diffraction (XRD), thermal properties (such as melting point or relative crystallinity) by DSC, mechanical tensile properties with Instron dynamometer, while thermal degradation with Thermogravimetric analysis (TGA). The objective was to find new uses of a by-product of the petroleum refinery industry in possibly improving the properties of a commodity polymer.

The present disclosure is related to our U.S. Pat. No. 9,018,285, Apr. 28, 2015 and Patent application, Siddiqui, M. N. "Free Radical Initiated Methyl Methacrylate-Arabian Asphaltene Polymer Composites", U.S. patent application Ser. No. 14/155,913, Jan. 15, 2014, and Siddiqui, M. N., "A Polypropylene-Asphaltene Composite and Methods Thereof" Patent application-450371US in process, each incorporated herein by reference in its entirety.

Experimental Details

Preparation of LDPE/Asphaltene Composites

LDPE was melt blended with different weight percentages of asphaltenes ("the filler") as filler using a Brabender Plasti-Corder@ (Brabender@ GmbH & Co., Germany) at 170° C. for 10 min at a rotor speed of 60 rpm. The LDPE for the example was a density of 0.92-0.922 g/cm$^3$, a melt index of 1.8-2.4, and an average MW of 80,000. The polymer was melted for two minutes. In the next two minutes asphaltene was added into the molten polymer. After complete addition of the filler, the mixing was continued for another six minutes. During the mixing, the temperature and torque were constant. The blended mixtures were then hot pressed at 180° C. under a pressure of 9 MPa using Carver hot-press (Indiana, USA). The samples were kept in the hot stage for 5 minutes. Then it was cooled for 10 more minutes. The relative amounts of LDPE and asphaltenes together with the code name of each sample appear in Table 1.

TABLE 1

Relative amounts of LDPE and asphaltenes and code number of each composite studied

| Sample | LDPE:Asphaltenes (wt %) |
|---|---|
| LD | 100:0 |
| LDA1 | 97.5:2.5 |
| LDA2 | 95:5 |
| LDA3 | 92.5:7.5 |
| LDA4 | 90:10 |
| LDA5 | 85:15 |

Characterization

Fourier Transform Infra-Red (FTIR) Spectroscopy

For the characterization of the chemical structure of the pristine LDPE and its composites, FTIR spectroscopy was used. The instrument used was an FTIR spectrophotometer of Perkin-Elmer, Spectrum One. The resolution of the equipment was 4 cm$^{-1}$ and the recorded wavenumber range was from 450 to 4000 cm$^{-1}$ and 32 spectra were averaged to reduce the noise.

Thermogravimetric Analysis (TGA)

To determine the thermal stability of the composition TG analysis was performed on a Pyris 1 TGA (Perkin Elmer, Massachusetts, USA) thermal analyzer equipped with a sample pan made of Pt. Samples of about 5 mg-8 mg were used. The samples were heated from ambient temperature to 600° C. at a heating rate 10° ° C./min, under a 20 ml/min nitrogen flow.

Differential Scanning Calorimetry (DSC)

Thermal properties of the composites were measured by DSC. The instrument used was the DSC-Diamond from Perkin-Elmer (Massachusetts, USA). The sample mass was approximately 5.5 mg in all measurements. The experimental conditions of the measurements included the following steps: Heat from 30° C. to 190° C. at 20° C./min; Hold at 190° C. for 2 min; Cool from 190° C. to −40° C. at 20° C./min; Hold at −40° C. for 2 min; and Heat from −40 to 190 at 20° C./min. All melting temperature results are from the second heating to eliminate thermal history of the sample. Crystallization was recorded during cooling from the melt.

X-Ray Diffraction (XRD)

X-ray diffraction (XRD) patterns of LDPE and its composites were obtained from an XRD-diffractometer (model Richard Seifert 3003 TT, Ahrensburg, Germany) with a CuKa radiation for crystalline phase identification ($\lambda$=0.15405 nm for CuKa). The scanning range, 2θ, of the samples was from 5° to 50°, at steps of 0.05 and counting time of 5 s.

Scanning Electron Microscopy

Scanning electron microscopy (SEM) images were taken with accelerating voltage of 15.00 kV (model Zeiss Supra 55 VP, Jena, Germany).

Tensile Mechanical Properties.

The tensile mechanical properties were studied on relatively thin films of the polymer or composites. Dumbbell-shaped tensile-test specimens (central portions, 5×0.5 mm thick, gauge length 22 mm) were cut from the sheets in a Wallace cutting press and conditioned at 23° C. and 55-60% relative humidity for 48 h. The stress-strain data were obtained with an Instron model BlueHill 2 tensile-testing machine (Massachusetts, USA), which was maintained under the same conditions and operated at an extension rate of 5 mm/min. The values of the yield stress, tensile strength, and elongation at break were determined according to ASTM D 1708-66. Five specimens were tested for each sample, and the average values are reported.

Dynamic Mechanical Thermal Analysis (DMTA).

Thermal mechanical tests were done using a dynamic mechanical analysis instrument (Perkin Elmer Diamond DMA Technology SII, Massachusetts, USA) in sinusoidal three-point bending mode. The vibration frequency was 1 Hz, the stress 4000 mN and the amplitude 10 m. The temperature was varied from 25° C. to 130° C. with a scanning rate of 3° C./min in a nitrogen atmosphere. Rod-like specimens were prepared with dimensions 2×2×40 mm.

Results

FTIR Spectra

The FTIR spectra of all samples appear in FIG. 1. The spectra of all samples show the presence of the traditional absorption bands of polyethylene. These are: high intensity peaks at 2851 and 2921 cm$^{-1}$ 101 attributed to the vibration mode of the chain methylene (—CH$_2$) groups, (stretching of C—H bonds), at 1467 cm$^{-1}$ 102 bending vibrations of symmetric methylene groups (C—H) and at 721 cm$^{-1}$ 103 corresponding to —CH$_2$ rocking (deformation and elongation mode of CH$_2$ group).

In the composites almost the same spectra were recorded, since the same characteristic chemical groups appear in the asphaltenes as in LDPE and they are mainly C—H bonds in either —CH$_2$ or —CH$_3$.

Melting and Crystallization Behavior

Figure 2:
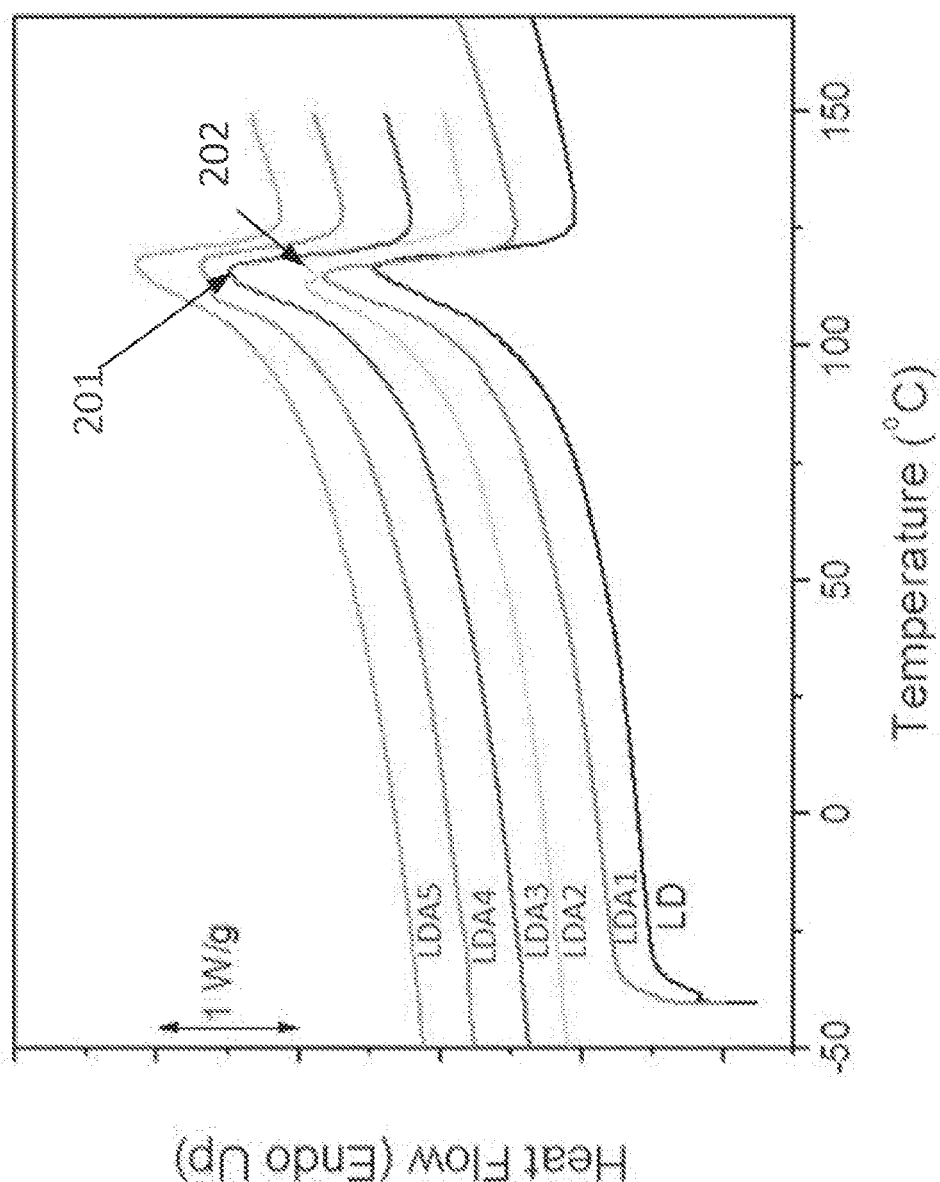
FIG. 2 is a series of DSC scans of pristine LDPE and its composites with various amounts of asphaltenes obtained during the second heating to evaluate the melting temperature.

In order to study the melting behavior of pristine LDPE and all its composite materials, DSC thermograms were recorded and results obtained during the second heating appear in FIG. 2. The melting peak temperatures and the total heat of fusion obtained from these curves are reported in Table 2. As it can be seen all curves are similar and most of the samples melt at approximately 116° C. 201, except of LDA2 where a slightly higher value, 118° C. 202 was measured. In addition, ΔH$_m$ of the composites is always lower than the pristine LDPE except for the LDA2 sample, where a value similar to LDPE was measured.

Figure 3:
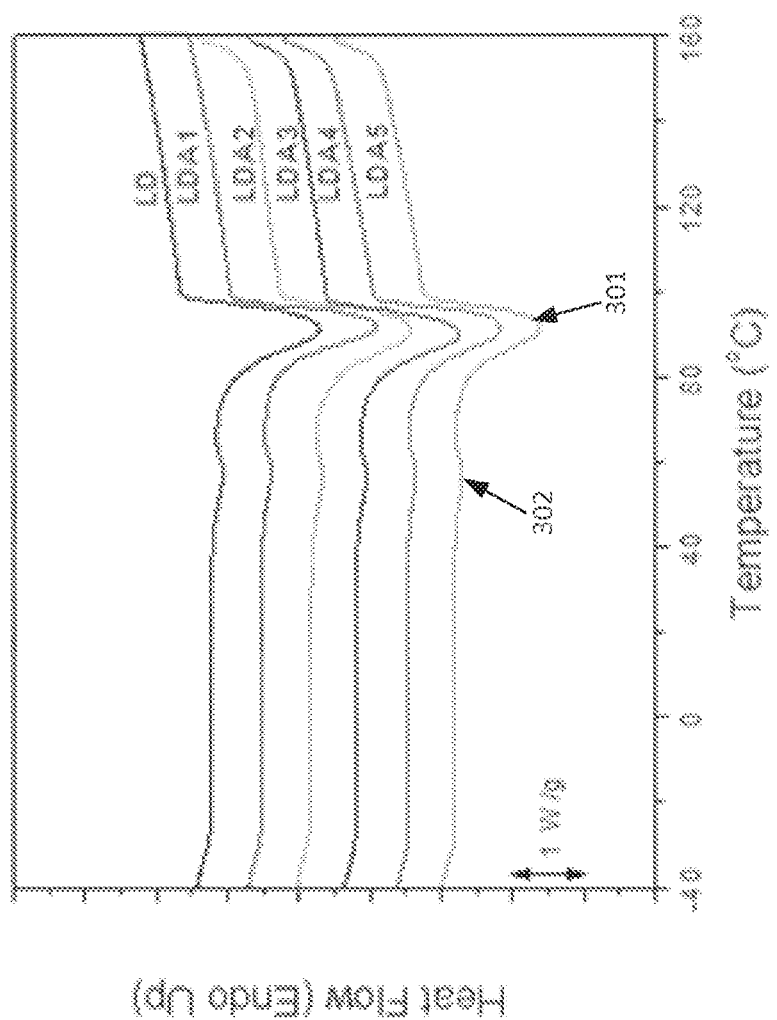
FIG. 3 is a DSC thermogram of pristine LDPE and its composites with various amounts of asphaltenes obtained during cooling to estimate melt crystallization.

Crystallization of the samples was also recorded during cooling from the melt. Results appear in FIG. 3 and Table 2. Two exothermic peaks were recorded, one is strong and sharp emerging at 91° C. 301 and the other is small, rather like a broad shoulder, emerging at about 57° C. 302. This is an indication of existence of crystallites with various thicknesses. Furthermore, smaller crystallites content (the shoulder peak) is less than that of larger ones. These double crystallization peaks are also an indication of a high degree of branching found in LDPE. More branched chains form more defected and less stable crystals that form at lower temperature.

The lower melting enthalpy measured for the LDA5 sample was also reflected in lower total heat released during crystallization from this sample and as a result of lower crystallinity of the whole composite. If the relative amount of the polymer in the composite is taken into consideration, the following equation providing the corrected degree of crystallinity, X$_{c,cor}$ of each composite can be derived as:

$$X_{c,cor} = \frac{\Delta H_m}{\Delta H_m^0 w} 100$$

where, ΔH$_m$ is the heat of fusion of LDPE and its composites, ΔH$_m^0$ is the heat of fusion for 100% crystalline LDPE taken equal to 293.6 J/g and w is the weight fraction of LDPE in the composites.

From the corrected degree of crystallinity, values reported in Table 2, it seems that LDA2 composite has almost the same crystallinity with pristine LDPE, while all other composites have lower values. Therefore, it seems that the addition of asphaltenes in LDPE is beneficial to the crystallization of LDPE only until the amount of 5%. Therefore, this value seems to be the optimum concerning the nucleating effect of asphaltenes in the LDPE matrix.

TABLE 2

Results from DSC measurements, T$_m$ melting peak temperature, T$_c$ crystallization peak temperature, ΔH$_m$ total heat during melting, ΔH$_c$ total heat released during crystallization X$_c$ degree of crystallinity and X$_{c,cor}$ corrected degree of crystallinity.

| Sample | T$_m$ (° C.) | ΔH$_m$ (J/g) | T$_{c1}$ (° C.) | T$_{c2}$ (° C.) | ΔH$_{cryst}$ (J/g) | X$_c$ (%) | X$_{c, cor}$ (%) |
|---|---|---|---|---|---|---|---|
| LD | 116.2 | 96.6 | 91.3 | 57.2 | 100.5 | 32.9 | 32.9 |
| LDA1 | 114.6 | 84.7 | 92.0 | 58.1 | 93.3 | 28.8 | 29.6 |
| LDA2 | 118.0 | 92.0 | 90.8 | 56.9 | 99.8 | 31.3 | 33.0 |
| LDA3 | 115.6 | 87.1 | 90.0 | 56.7 | 92.6 | 29.7 | 32.1 |
| LDA4 | 116.6 | 80.8 | 91.6 | 57.0 | 90.3 | 27.5 | 30.6 |
| LDA5 | 116.9 | 71.7 | 91.6 | 57.1 | 80.1 | 24.4 | 28.7 |

WAXD Examinations

Figure 4:
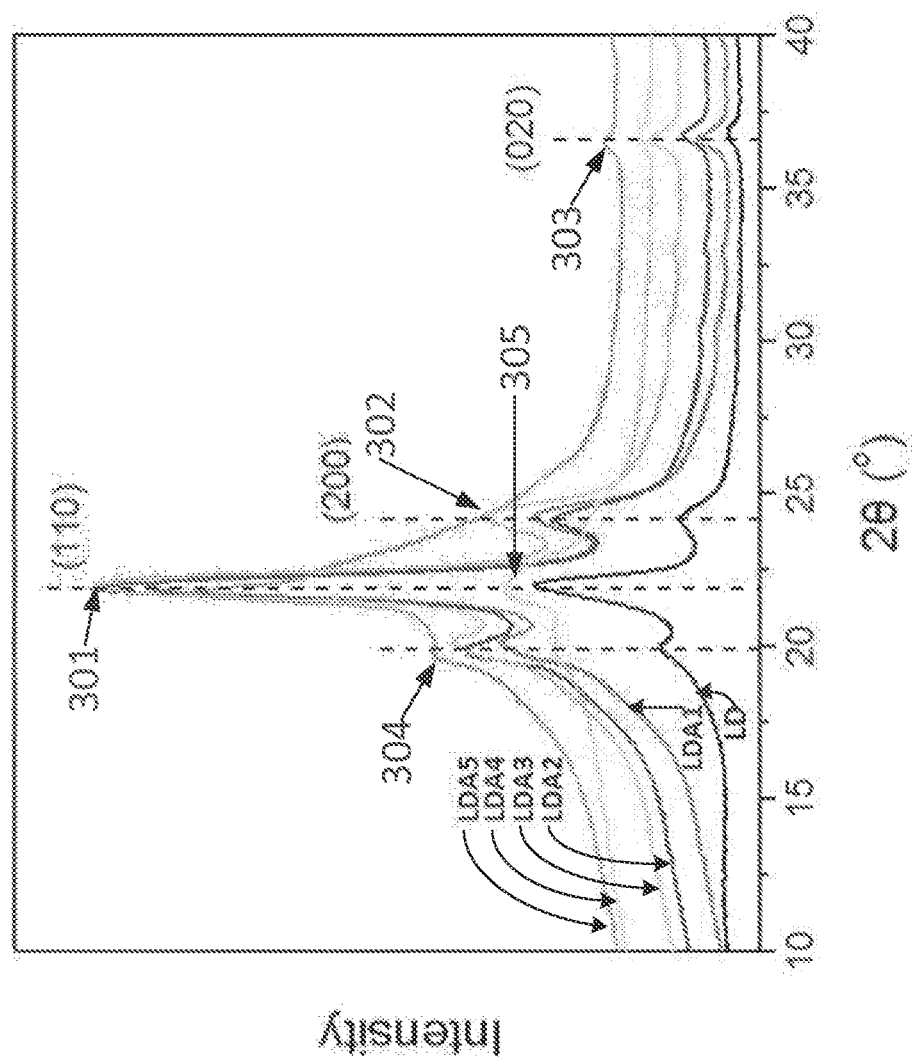
FIG. 4 is an XRD spectrum of LDPE and LDPE/asphaltene composites with various amounts of the asphaltene.
Figure 5A:
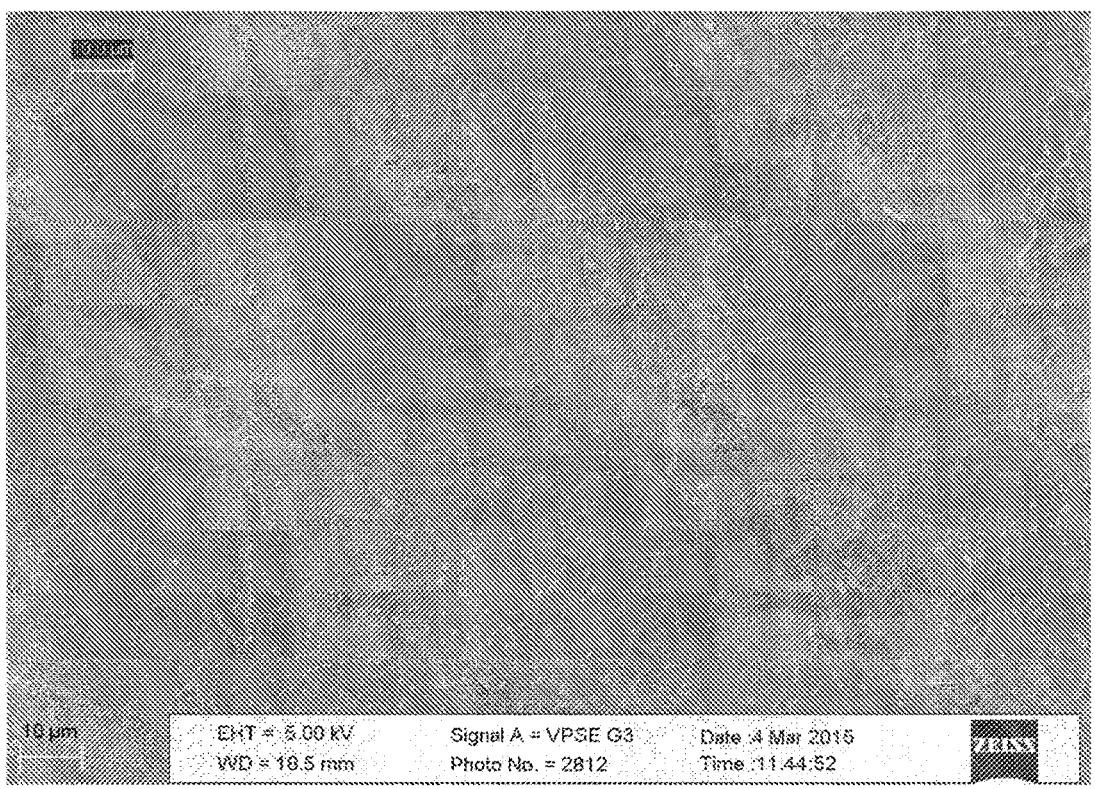
FIG. 5A is an exemplary SEM image of LDPE/asphaltenes composite having 0 wt % asphaltenes.
Figure 5B:
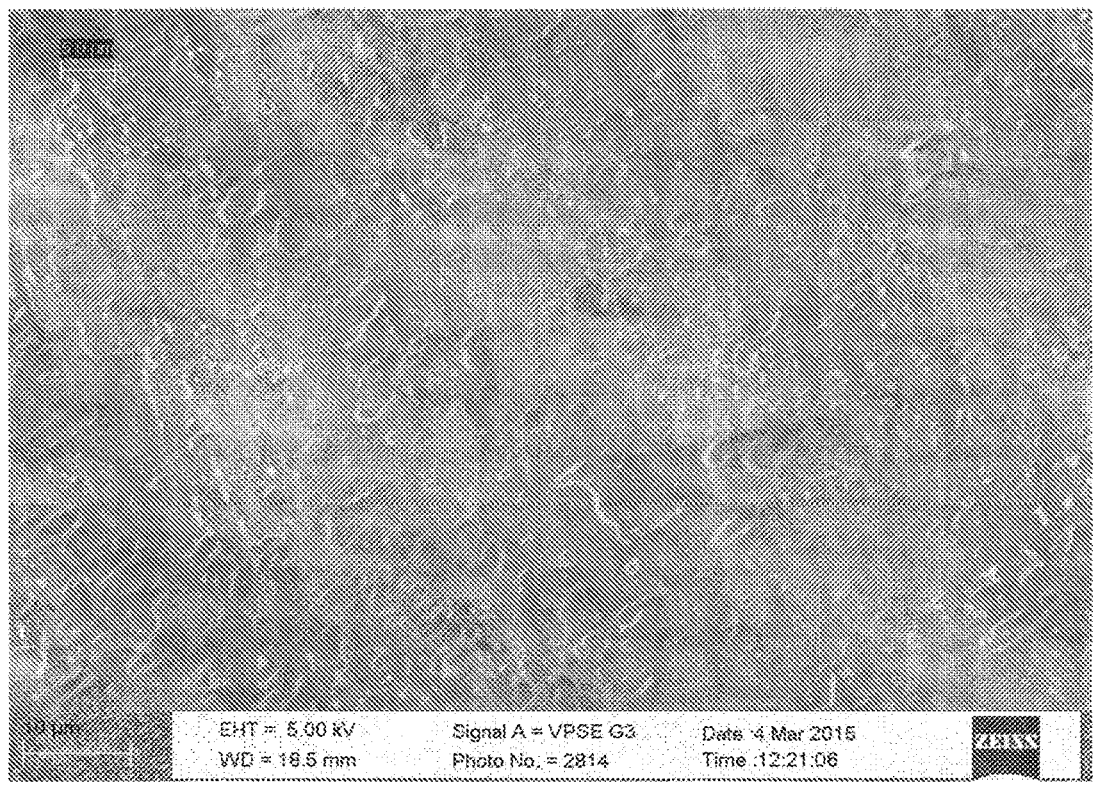
FIG. 5B is an exemplary SEM image of LDPE/asphaltenes composite having 2.5 wt % asphaltenes.
Figure 5C:
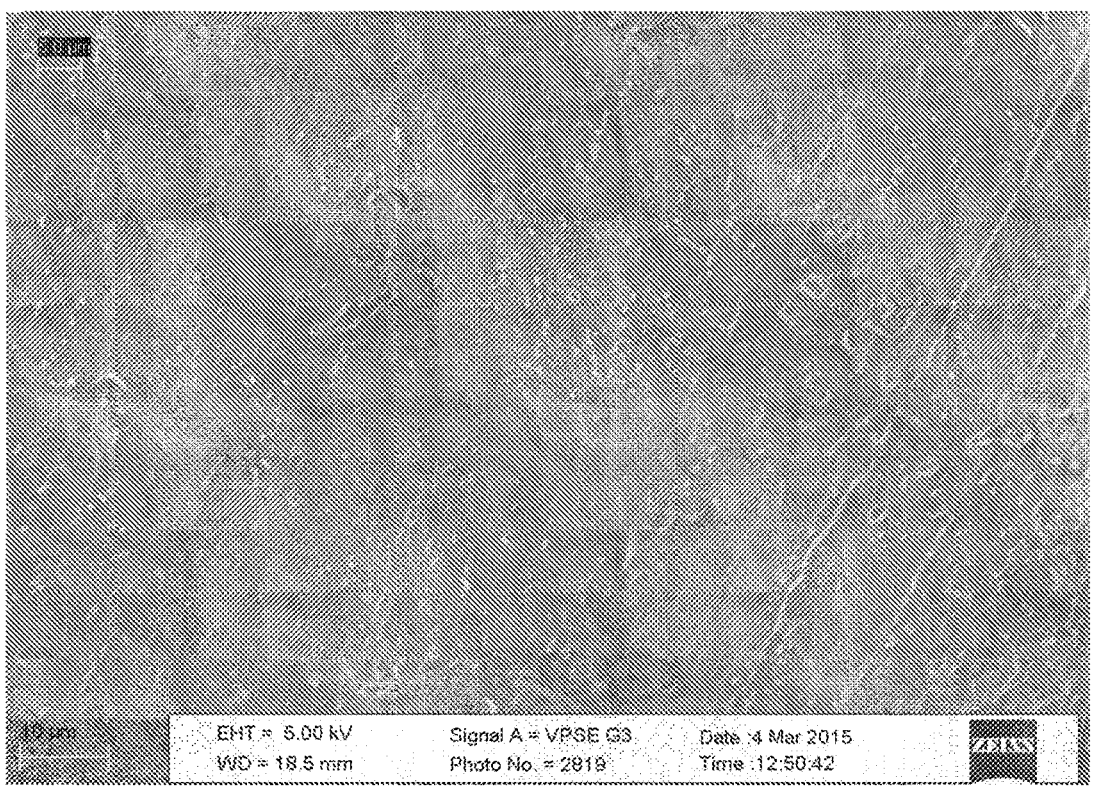
FIG. 5C is an exemplary SEM image of LDPE/asphaltenes composite having 5 wt %/o asphaltenes.
Figure 5D:
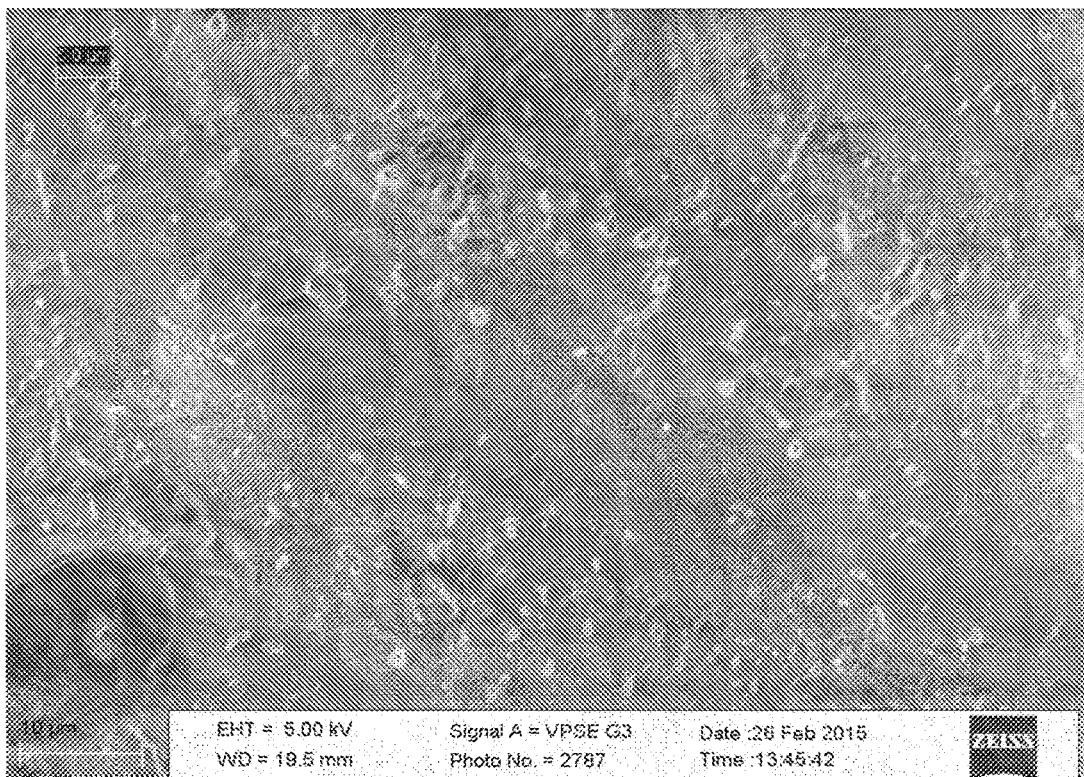
FIG. 5D is an exemplary SEM image of LDPE/asphaltenes composite having 7.5 wt % asphaltenes.
Figure 5E:
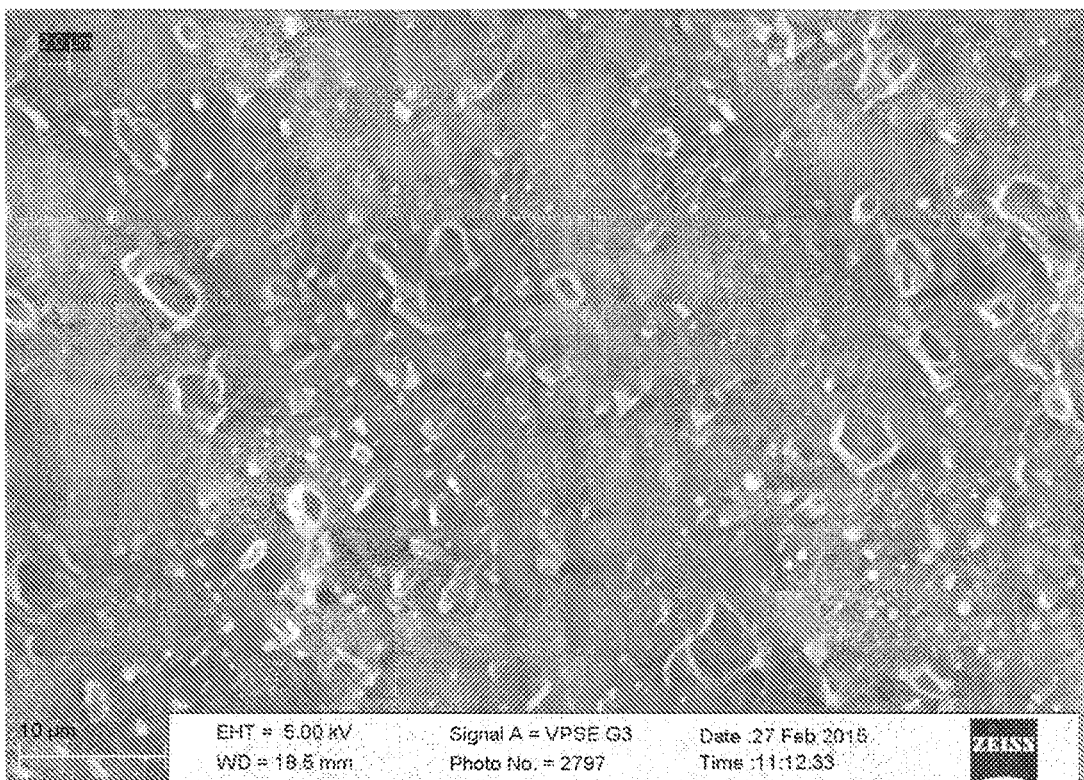
FIG. 5E is an exemplary SEM image of LDPE/asphaltenes composite having 10 wt % asphaltenes.
Figure 5F:
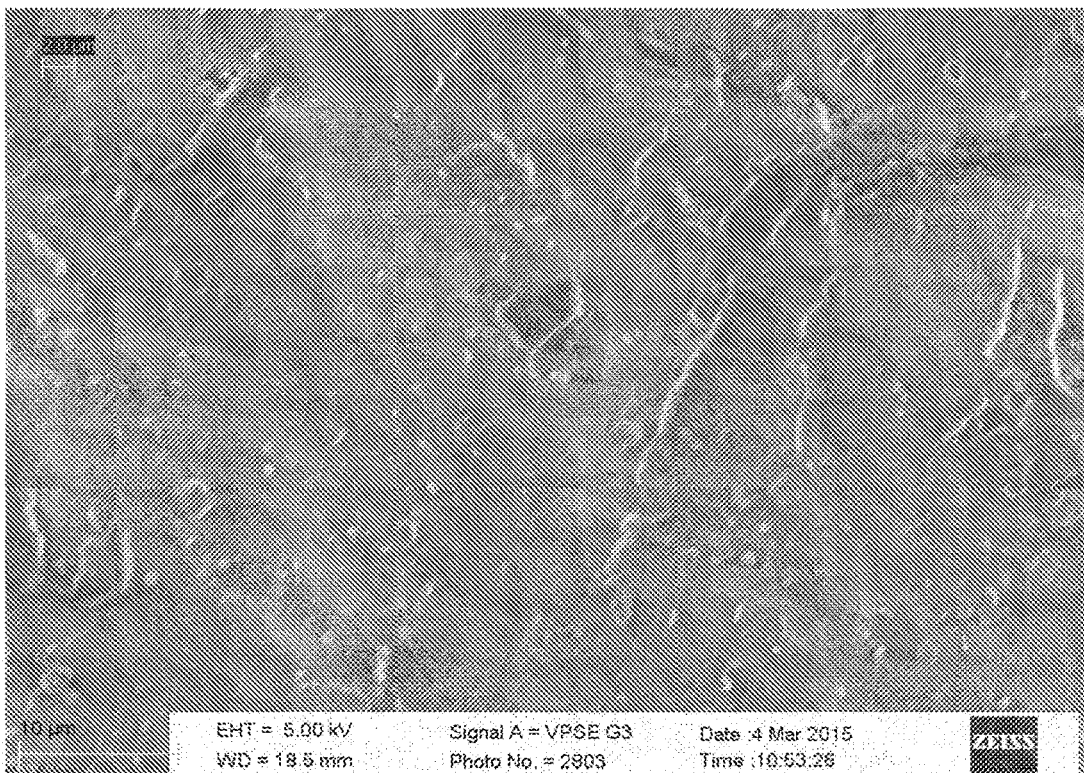
FIG. 5F is an exemplary SEM image of LDPE/asphaltenes composite having 15 wt % asphaltenes.

FIG. 4 shows XRD patterns of pristine LDPE and its composites. The characteristic diffraction peaks at 2θ: 22° (110) 301, 24° (200) 302 and 36.5° (020) 303 are clear. A small peak at 20° 304 was also measured in all samples. LDPE filled with asphaltenes crystallizes with the same phase of the pristine polymer with however a significant variation of the intensity of the peaks between pristine LDPE and the composites. The crystallinity and crystal structure of the composites LDA1 and LDA2 were nearly identical. However, for composites LDA4 and LDA5 a broad peak appears at 2θ=22° 305 which overlaps the peak at 24°. The increase in the intensity of the peaks of the LDA1 and LDA2 samples indicates an increase in the crystalline nature of the composite at these relative amounts.

The crystallite size (L) can be obtained by the Scherrer's formula from the half-width of (110) 301 diffraction peak:

$$L = \frac{K\lambda}{b\cos(\theta)}$$

where, K is a constant assumed to be 0.94 for Full Width at Half Maxima (FWHM) of spherical crystals with cubic symmetry, λ is the wavelength of X-ray beam (0.154 nm), b is FWHM in radians and θ is the angle at the dominant peak (around 22°).

Results on the FWHM and the crystallite size, L estimated for all samples appear in Table 3. It can be seen that the crystallite size increases from LD to LDA2 and then decreases significantly to very low values for LDA4 and LDA5. The reduction of crystallite size may be ascribed to the hindrance of mobility of the LDPE chains by the presence of large amounts of asphaltenes. This in turn is associated with the decrease of local order within the polymer. From these data appears that LDA2 with 5% asphaltenes appears to have the best performance concerning the crystallinity of the mixture as it was also concluded from DSC measurements.

TABLE 3

Characteristic peaks and calculated crystallite size for pristine LDPE and its composites obtained from WAXD measurements.

| Sample | 2θ (°) | | | | FWHM (radians) | L (nm) |
|---|---|---|---|---|---|---|
| LD | 19.9 | 22.0 | 24.1 | 36.8 | 0.0195 | 7.52 |
| LDA1 | 20.0 | 22.0 | 24.2 | 36.5 | 0.0188 | 7.80 |
| LDA2 | 19.9 | 21.9 | 24.1 | 36.7 | 0.0164 | 8.96 |
| LDA3 | 19.9 | 21.9 | 24.2 | 36.6 | 0.0210 | 7.04 |
| LDA4 | 19.9 | 21.8 | — | 36.7 | 0.0733 | 2.01 |
| LDA5 | 19.8 | 21.75 | — | 36.5 | 0.0366 | 4.02 |

SEM Observations

SEM images of all LDPE/asphaltenes composites appear in FIG. 5A through FIG. 5F.

Higher agglomerates were observed with increased asphaltene content in samples LDA4 and LDA5.

Thermogravimetric Analysis

Figure 6A:
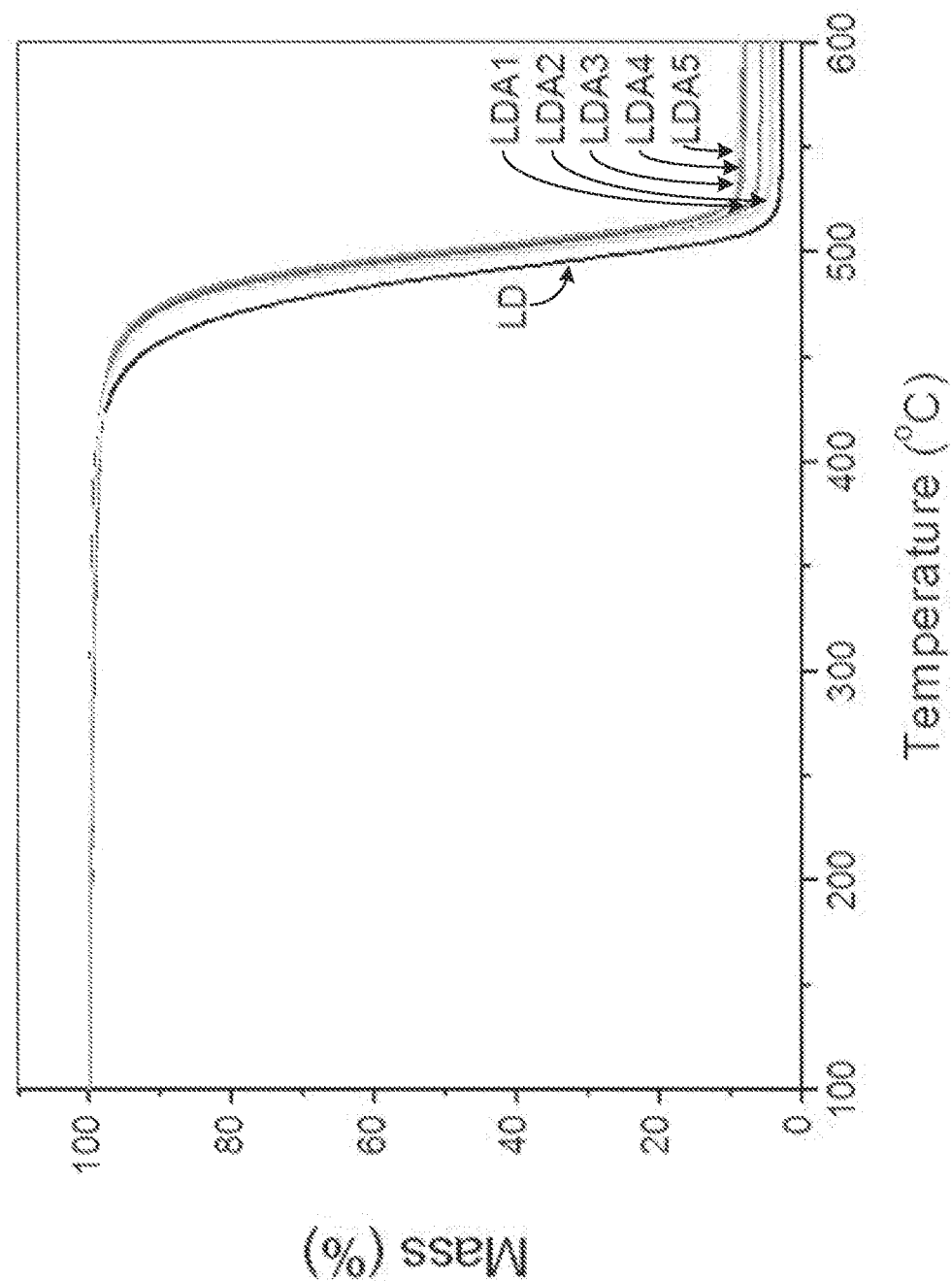
FIG. 6A is an exemplary thermal stability graph of neat LDPE and its composites with different amounts of asphaltenes.
Figure 6B:
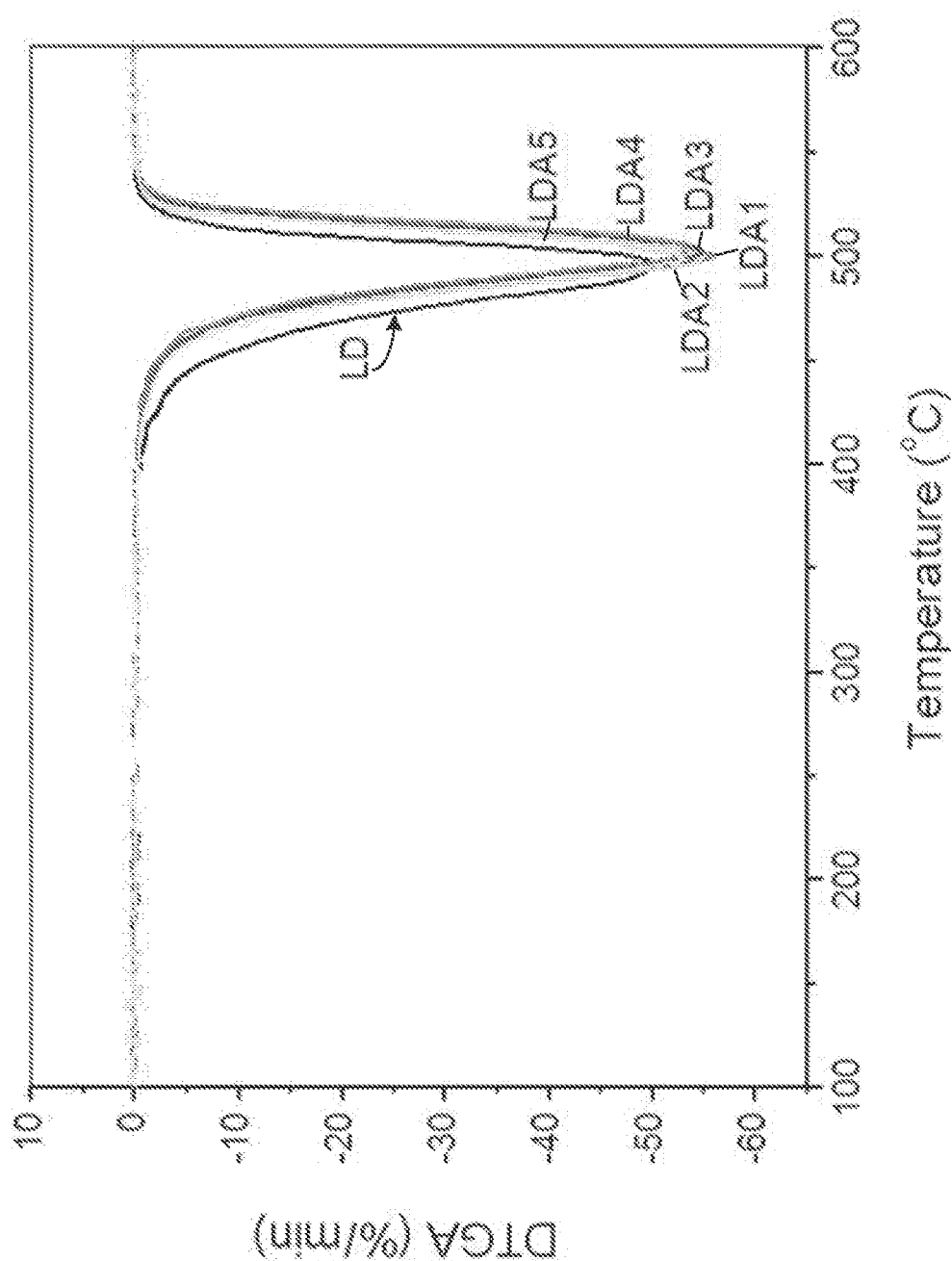
FIG. 6B is an exemplary thermogravimetric analysis graph of neat LDPE and its composites with different amounts of asphaltenes.

Thermal stability of neat LDPE and its composites with different amounts of asphaltenes appears in FIG. 6A. The corresponding differential TG curves appear in FIG. 6B. As it can be seen, degradation completes in one step in all different samples and all composites present curves shifted to higher temperature values compared to pristine LDPE. This means that all composites have better thermal stability compared to LDPE. LDPE thermally degrades to volatile products leaving a residue of around 2.7% at 600° C. through a radical chain process, whose onset ($T_{2\%}$) and maximum weight loss rate temperature ($T_p$) are around 422° C. and 495° C., respectively. The initial decomposition temperature of all composites is shifted to higher temperatures compared to pristine LDPE ($T_{2\%}$ in Table 4) confirming the protecting role of the asphaltenes in relation to the thermal stability of LDPE. The higher $T_{2\%}$ temperature was recorded in the LDA1 composite, meaning incorporation of 2.5% asphaltenes in the LDPE matrix. Moreover, from the temperatures where degradation reaches 50% ($T_{50\%}$), as well as where the peak in the degradation rate appears ($T_p$), it seems that best thermal stability is achieved in the LDA2 or LDA3 composite, i.e. with 5% or 7.5 wt % of the additive. It seems that the addition of asphaltenes at this concentration forms a protective layer (thermal shield) around the polymer which delays the degradation induced by heat and acts as a thermal barrier limiting the emission of the gaseous degradation products, resulting in an increase in the thermal stability of the material. Therefore, the most effective protection seems to be achieved with an amount near 5 wt %. Higher amount of asphaltene added (i.e. 10% to 15%) reduces the thermal stability of the composite. It is believed that the homogeneous dispersion of asphaltenes results in trapping the volatilizing matrix from escape to the atmosphere. Higher amount of asphaltenes, form agglomerates resulting in a non-homogeneous mixture.

TABLE 4

Temperature where thermal degradation starts ($T_{2\%}$), at 50% conversion ($T_{50\%}$) and at the degradation peak ($T_p$) as well as residue at 600° C. of pristine LDPE and LDPE/asphaltenes composites.

| Sample | $T_{2\%}$ | $T_{50\%}$ | $T_p$ | Residue at 600° C. (%) |
|---|---|---|---|---|
| LD | 422 | 488 | 495 | 2.7 |
| LDA1 | 432 | 498 | 500 | 5.0 |
| LDA2 | 430 | 500 | 501 | 4.4 |
| LDA3 | 428 | 499 | 502 | 7.7 |
| LDA4 | 426 | 496 | 499 | 8.0 |
| LDA5 | 429 | 497 | 498 | 8.5 |

Mechanical Properties

Figure 7:
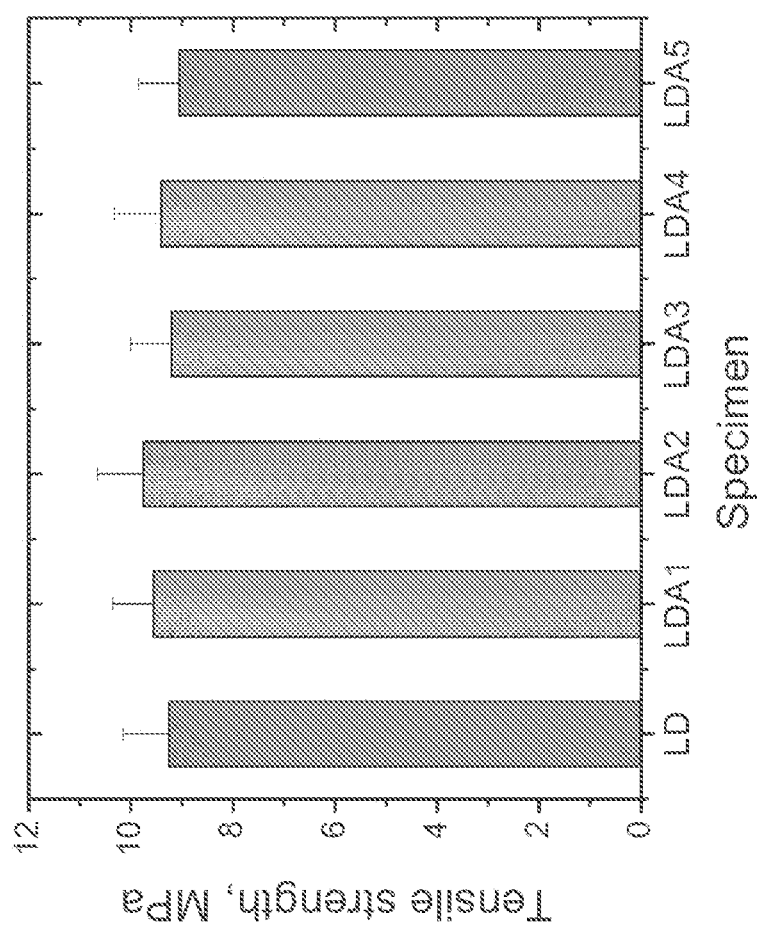
FIG. 7 is an exemplary graph of tensile strength of the composition with different amount of asphaltenes.

Tensile mechanical properties of LDPE and LDPE/asphaltenes composites are illustrated in Table 5. From the measurements it seems that the highest tensile strength was measured for the LDA2 composite, according to previous findings. When a high content of asphaltene was incorporated its dispersion in the LDPE matrix becomes more difficult resulting in lower tensile strength. It seems that the best additive-matrix adhesion is obtained at a relative amount of asphaltene equal to 5 wt % (FIG. 7).

TABLE 5

Tensile mechanical properties from Instron analysis and storage modulus from DMA of pristine LDPE and its composites with asphaltenes.

| Sample | Tensile strength (MPa) | Elongation at break (%) | Storage Modulus, E' (GPa) at 23° C., from DMA |
|---|---|---|---|
| LD | 9.25 ± 0.91 | 149.0 ± 14 | 0.96 |
| LDA1 | 9.56 ± 0.87 | 153.1 ± 14 | 1.17 |
| LDA2 | 9.76 ± 0.90 | 168.3 ± 14 | 1.06 |
| LDA3 | 9.20 ± 0.82 | 133.6 ± 14 | 0.71 |
| LDA4 | 9.42 ± 0.94 | 134.8 ± 14 | 0.61 |
| LDA5 | 9.05 ± 0.94 | 136.6 ± 14 | 0.57 |

Dynamic Thermo-Mechanical Properties Using DMA

Figure 8A:
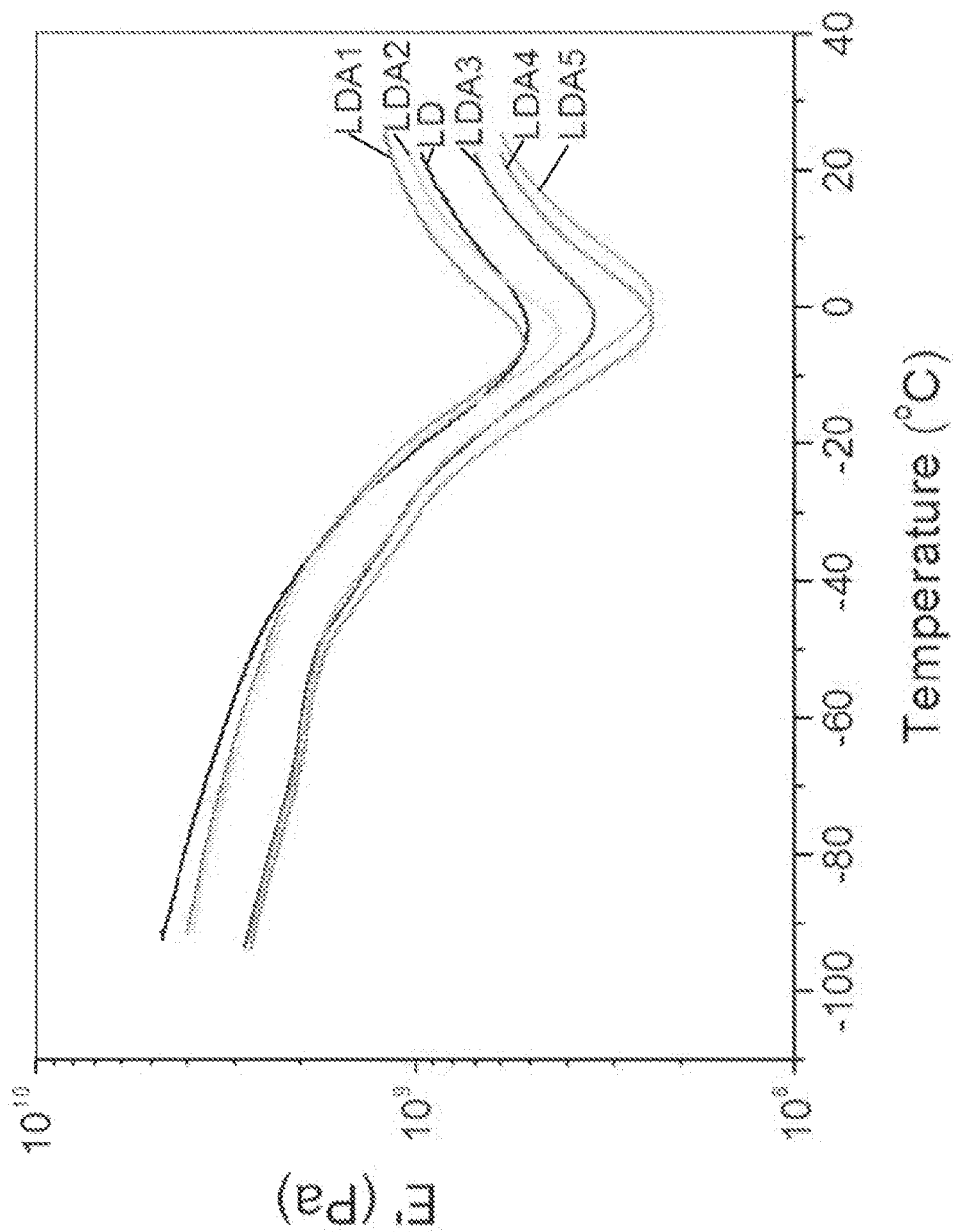
FIG. 8A is an exemplary DMA graph of the storage modulus, E' obtained from DMA measurements.
Figure 8B:
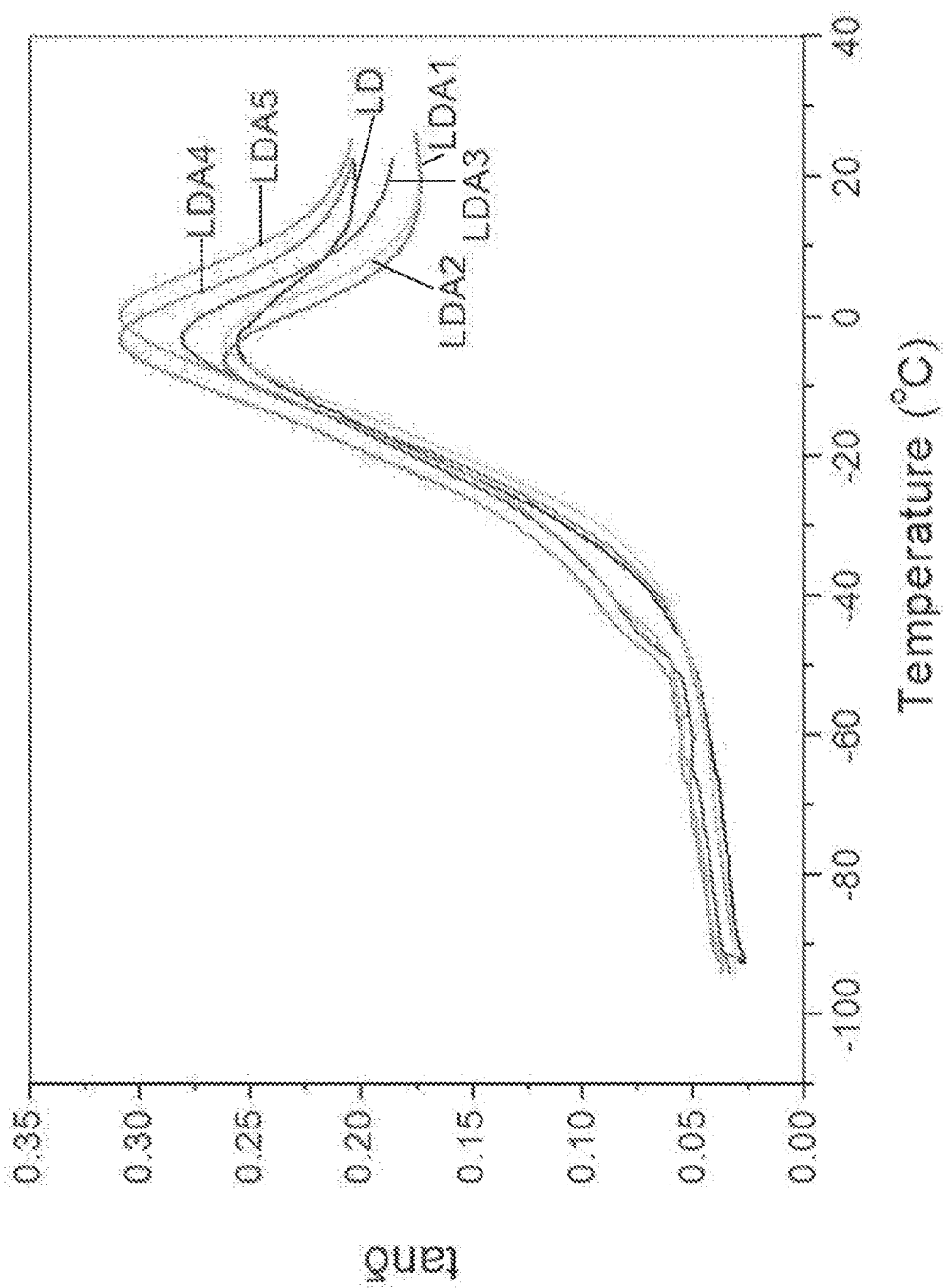
FIG. 8B is an exemplary DMA graph of the phase angle and the tan δ=E"/E' obtained from DMA measurements.
Figure 8C:
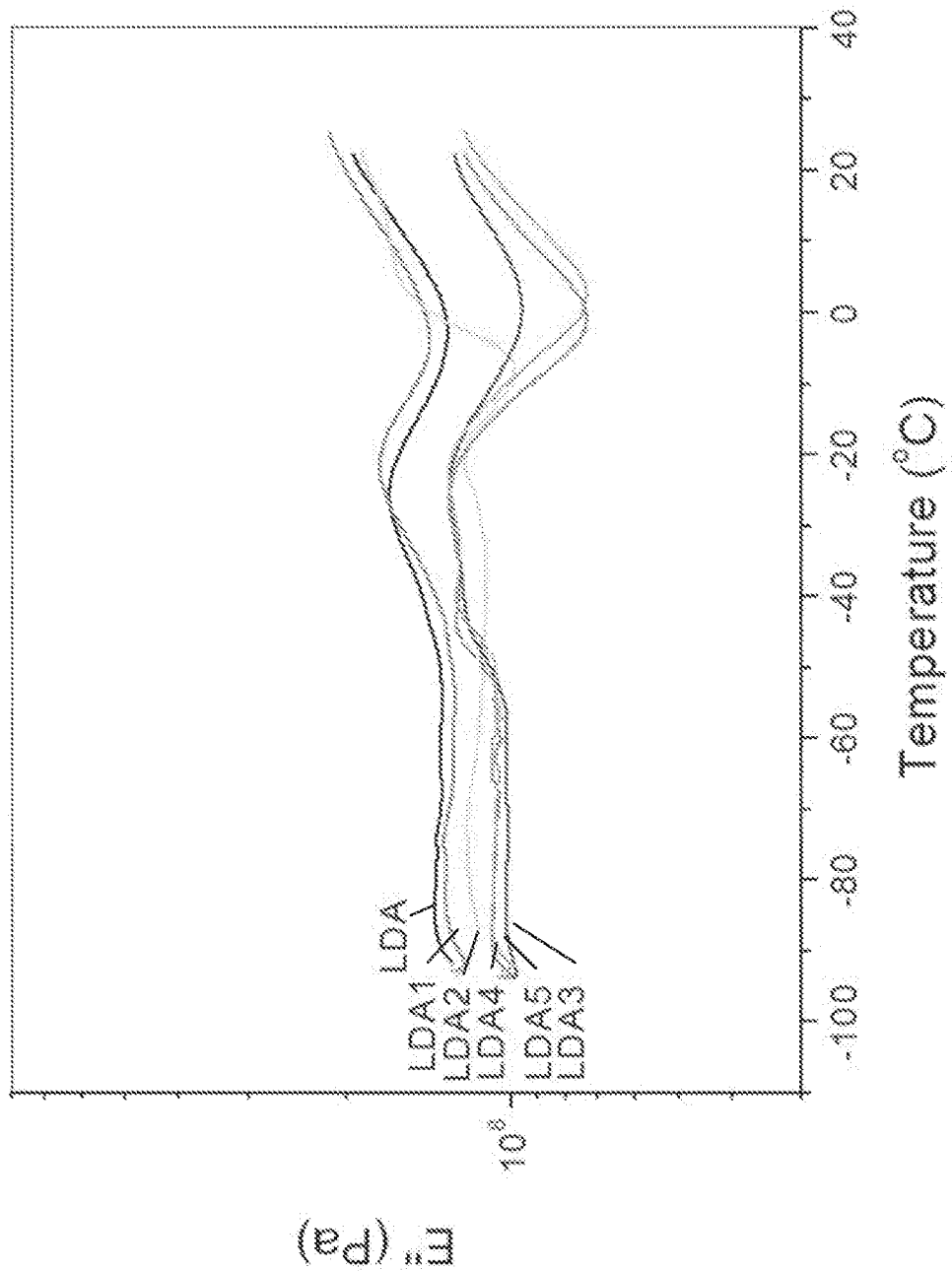
FIG. 8C is an exemplary DMA graph of the loss modulus, E" obtained from DMA measurements.

The variation of storage modulus, E', loss modulus, E" and phase angle, tan δ=E"/E' obtained from DMA measurements appear in FIG. 8A, FIG. 8B, and FIG. 8C. Samples LD, LDA1 and LDA2 appear to have higher values of the storage and loss modulus compared to LDA3, LDA4 and LDA5. The values of E' at room temperature (around 22° C.) for all studied samples are included in Table 5. It is seen that LD, LDA1 and LDA2 have a value around 1 GPA much higher than the others. In LDPE three relaxations are normally observed, identified as α, β and γ in order of decreasing temperature. The α-relaxation is normally observed between 30° C. and the melting point, the β-relaxation between −55° C. and 25° C., while the γ-relaxation between −145° C. and −95° C. In FIG. 8B one peak is observed at around −4° C., associated with the β-relaxation of LDPE. From FIG. 8A, FIG. 8B, and FIG. 8C no results can be obtained for the α and γ relaxations. Results on the β-relaxation are included in Table 6. It seems that all samples except of LDA1 and LDA5 have almost the same β-relaxation temperature.

TABLE 6

Characteristic thermal transitions estimated from the peak in tan δ

| Sample | β-relaxation (° C.) |
|---|---|
| LD | −3.5 |
| LDA1 | −6.0 |

TABLE 6-continued

Characteristic thermal transitions estimated from the peak in tanδ

| Sample | β-relaxation (° C.) |
|---|---|
| LDA2 | −4.0 |
| LDA3 | −3.0 |
| LDA4 | −3.0 |
| LDA5 | 0.0 |

Several composites of LDPE with different amounts of asphaltenes were prepared by the melt-mixing technique. From the analysis of their properties, it the data from the example indicate that the addition of asphaltenes:

May not alter the chemical characteristics of LDPE as measured by FTIR measurements showing the same absorbance peaks May increase the thermal stability of LDPE by almost 10° C. as determined by TGA measurements; wherein degradation of the composites was shifted to higher values.

May retain almost the same melting and crystallization temperature, while decreases the enthalpy of fusion and crystallization, except of LDA2 sample, resulting in decreased relative degree of crystallinity, as it comes from DSC thermal scans.

May retain the same crystalline phase as measured by WAXD measurements. High amounts of asphaltenes tend to disturb the crystalline state while the higher crystallite size was measured for the LDA2 sample.

May not alter significantly the mechanical tensile properties, while only LDA2 was found to have improved tensile strength.

May increase the storage modulus only for LDA1 and LDA2, while these properties seem to deteriorate when the amount of asphaltenes added is very high.

Overall, the example presents a case in which the weight percentage of asphaltenes that may be added in the LDPE around 5 wt % resulting in the best dispersion in the polymeric matrix, larger crystallite size, enhanced thermal stability, highest relative degree of crystallinity and improved mechanical tensile or thermo-mechanical properties.

The invention claimed is:

1. An asphaltene/polyethylene blend, comprising:
an asphaltene, wherein the asphaltene is extracted from at least one of a heavy atmospheric residue, an oil sand, bitumen, and a biodegraded oil, and a weight percent of the asphaltene is 0.1%-7.5% relative to a total weight of the asphaltene/polyethylene blend; and
a low density polyethylene polymer with a density of 0.92-0.922 $g/cm^3$;
wherein the asphaltene and the low density polyethylene polymer are homogeneously dispersed throughout the asphaltene/polyethylene blend, the asphaltene/polyethylene blend has a weight loss onset 6° C.-20° C. higher than an average weight loss onset of the low density polyethylene polymer, a degree of crystallinity of 27%-34%, and a $\Delta H_m$ of 84.7 to 92.0 J/g.

2. The asphaltene/polyethylene blend of claim 1, wherein the asphaltene/polyethylene blend has a peak melting point of 110° C.-123° C.

3. The asphaltene/polyethylene blend of claim wherein the asphaltene/polyethylene blend has a storage modulus of 0.71-1.17 GPa at a temperature of 22° C.-25° C.

4. The asphaltene/polyethylene blend of claim 1, wherein the asphaltene/polyethylene blend has a tensile strength of 9.20-9.56 MPa.

5. The asphaltene/polyethylene blend of claim 1, wherein the asphaltene comprises 0.9 to 1.8 wt % of nitrogen, 7.5 to 8.1 wt % of sulfur, 1.9 to 2.6 wt % of oxygen, relative to the total weight of the asphaltene.

6. The asphaltene/polyethylene blend of claim 1, wherein a weight percent of the low density polyethylene polymer is 92.5%-99.9% relative to the total weight of the asphaltene/polyethylene blend.

* * * * *